US007830526B2

(12) United States Patent
Peng et al.

(10) Patent No.: US 7,830,526 B2
(45) Date of Patent: Nov. 9, 2010

(54) METHOD AND APPARATUS FOR OPTICAL FREQUENCY MEASUREMENT (75) Inventors: Jin-Long Peng, Taoyuan County (TW); Tze-An Liu, Hsinchu (TW); Ren-Huei Shu, Hsinchu (TW)

(73) Assignee: Industrial Technology Research Institute, Hsin-Chu (TW)

( * ) Notice: Subject to any disclaimer, the term of this patent is extended or adjusted under 35 U.S.C. 154(b) by 352 days.

(21) Appl. No.: 12/015,965

(22) Filed: Jan. 17, 2008

(65) Prior Publication Data

US 2009/0097035 A1 Apr. 16, 2009

(30) Foreign Application Priority Data

Oct. 16, 2007 (TW) ............................... 96138607 A (51) Int. Cl.
*G01B 9/02* (2006.01)
(52) U.S. Cl. ..................................... 356/484
(58) Field of Classification Search ................. 356/450, 356/484, 488, 521
See application file for complete search history.

(56) References Cited

U.S. PATENT DOCUMENTS 6,097,487 A * 8/2000 Kringlebotn et al. ........ 356/450
6,853,456 B2 * 2/2005 Mells ......................... 356/484
7,564,561 B2 * 7/2009 Peng .......................... 356/451

FOREIGN PATENT DOCUMENTS

| JP | 08-101066 | | 4/1996 |
| JP | 2002174552 A | * | 6/2002 |
| JP | 2007212427 A | * | 8/2007 |

OTHER PUBLICATIONS

Sugiyama, Kazuhiko et al. "Optical Frequency Measurement Using Chirped-Mirror-Dispersion-Controlled Mode-Locked Ti:AI203 Laser". Japanese Journal of Applied Physics, vol. 45, No. 6A, 2006, pp. 5051-5062.*
Tze-An Liu, Ren Huei Shu, and Jin-Long Peng, Semi-automatic, Octave-spanning Optical Frequency, Aug. 26, 2007, 2 pages, Center for Measurement Standard, Industrial Technology Research Institute, 321 Section 2. Kuang Fu Road, Hsinchu 300, Taiwan.

(Continued)

Primary Examiner—Michael A Lyons
(74) Attorney, Agent, or Firm—WPAT, PC; Justin King (57) ABSTRACT A method and an apparatus for optical frequency measurement, using one or two frequency-stabilized mode-locked laser combs operating at different repetition rates to mix with a laser under measurement (LUM) respectively so as to generate two beat frequencies. The ordinal comb number where the beat frequency is generated is determined by measuring the ordinal comb number difference where the two beat frequencies are generated at different repetition rates so as to obtain the frequency of the LUM. The ordinal comb number difference is measured by using a dispersion device to offer an approximate ordinal comb number or by operating a mode-locked laser at three different repetition rates.

9 Claims, 7 Drawing Sheets

OTHER PUBLICATIONS

Jin-Long Peng and Ren Huei Shu, Determination of absolute mode number using two mode-locked laser combs in optical frequency metrology, Apr. 16, 2007, 8 pages, vol. 15, Center for Measurement Standards, 321 Section 2. Kuang Fu Road, Hsinchu 30042, Taiwan.

Jin-Long Peng and Ren Huei Shu, Absolute Mode Number Determination Using two Er:fiber Laser Combs for Optical Frequency Metrology, May 5, 2007, 2 pages, Center for Measurement Standards, 321 Section 2. Kuang Fu Road, Hsinchu 300, Taiwan.

\* cited by examiner

METHOD AND APPARATUS FOR OPTICAL FREQUENCY MEASUREMENT

BACKGROUND OF THE INVENTION

1. Field of the Invention

The present invention generally relates to a method and an apparatus for optical frequency measurement and, more particularly, to a method and an apparatus using one or two frequency-stabilized mode-locked laser combs operating at different repetition rates to measure the frequency of a laser under measurement (LUM). The ordinal comb number difference can be obtained according to the beat frequencies, the offset frequencies and the repetition rates so as to measure the ordinal comb number and the frequency of the LUM.

2. Description of the Prior Art

Since 1999 T. W. Hänsch used femtosecond pulsed lasers in optical frequency measurement of the cesium D1 line, mode-locked lasers have attracted lots of attention in optical frequency measurement.

Figure 1:
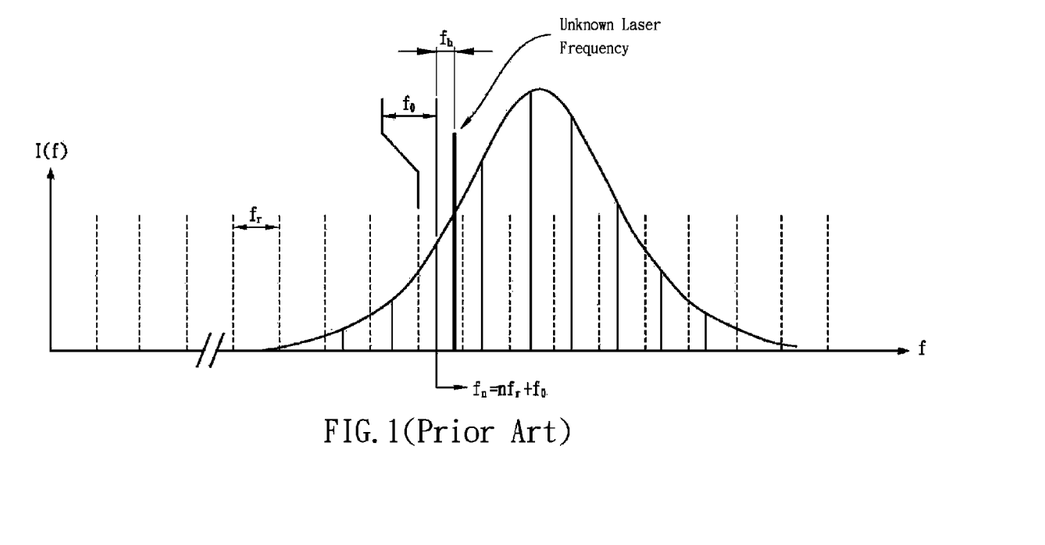
FIG. 1 is a schematic diagram showing an optical comb spectrum used to measure the frequency of an unknown laser in the prior art.
Figure 2:
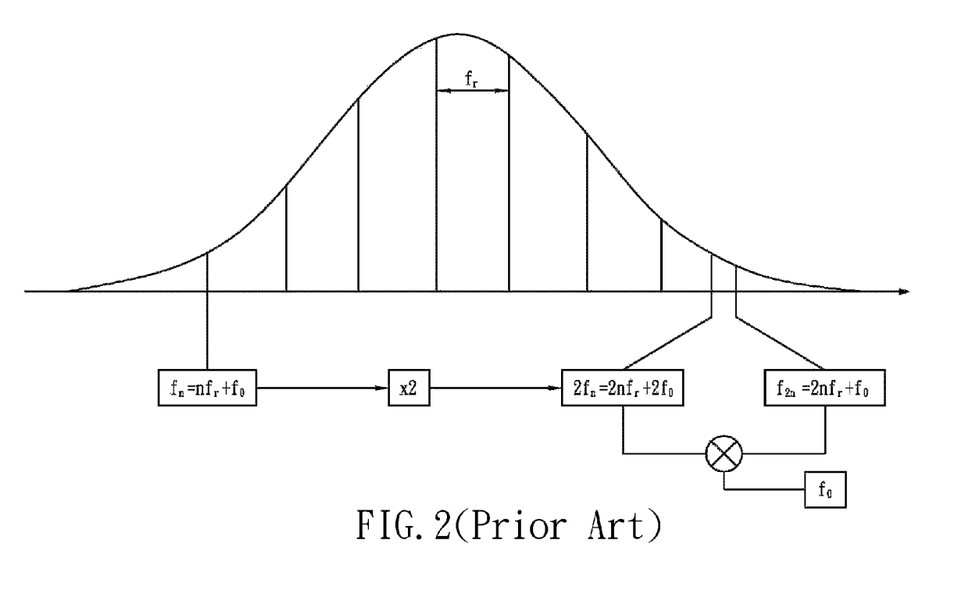
FIG. 2 is a schematic diagram showing an offset frequency measured by the f-2f self-referencing technique in the prior art.

As shown in FIG. 1, a mode-locked laser is an optical frequency comb (OFC) composed of a plurality of comb lines with identical frequency pitches in frequency-domain. The frequency of each comb line is integer multiples of the repetition rate $f_r$ plus an offset frequency $f_o$. That is, the frequency $f_n$ of the $n^{th}$ comb line can be expressed as:

$$f_n = n \times f_r + f_o$$

wherein n is a positive integer, $f_r$ is the pulse repetition frequency (or, in brief, the repetition rate) and $f_o$ is the carrier-envelope offset frequency (or, in brief, the offset frequency). The offset frequency $f_o$ is usually measured by using the self-referencing technique. FIG. 2 shows the theory of the f–2f self-referencing technique.

However, two possible values $f_o$ and $f_r - f_o$ may be obtained between 0 and $f_r$ with the self-referencing technique to measure the offset frequency of a mode-locked laser. It is required to determine one of $f_o$ and $f_r - f_o$ to be the correct offset frequency. By definition, either $f_o$ or $f_r - f_o$ plus the integer multiples of the repetition rate $f_r$ can be defined as an offset frequency. Moreover, for a measured beat frequency $f_b$, the beat frequency $f_b$ occurs when the frequency $f_L$ of the LUM is $f_b$ higher or lower than the comb line. Therefore, the frequency of the LUM can be $f_L = n \times f_r + f_o \pm f_b$ or $f_L = n \times f_r + (f_r - f_o) \pm f_b = (n+1) \times f_r - f_o \pm f_b$. Since n is left undetermined, the frequency of the LUM $f_L$ can be expressed as:

$$f_L = n \times f_r \pm f_o \pm f_b$$

In the latter representation, the offset frequency can be $-f_o$. Even though the ordinal comb numbers obtained using the two aforementioned methods may be different, the frequencies of the LUM thus measured are identical. In the specification of the present invention, the frequency of each comb line is integer multiples of the repetition rate $f_r$ plus a positive offset frequency $f_o$, which is the same as the former representation.

The correct offset frequency and the sign of the beat frequency can be determined by changing the repetition rate or the offset frequency according to the corresponding variation of the beat frequency. The ordinal comb number can be determined based on the following methods. In the first method, historic measurement data of the frequencies of the LUM are used, wherein the n value is determined only when the precision is within $\pm f_r/4$. In the second method, a wavemeter is used to determine an approximate frequency of the LUM. If the precision of the frequency measured by the wavemeter is within $\pm f_r/4$, it can be decided which comb line is closest to the frequency of the LUM so as to determine the n value. The precision of a commercial wavemeter is about $2 \times 10^{-7}$, which leads to 40 MHz inaccuracy for a 1550 nm laser. Therefore, the pitch of the OFC is at least 160 MHz so that it can work with the commercial wavemeter for optical frequency measurement.

In the third method, Long-Sheng Ma et al. used an OFC to determine the ordinal comb number without using a wavemeter by measuring the beat frequencies at multiple repetition rates $f_r$ and $f_r'$ and recording the ordinal comb number variation m when the repetition rate changed. Accordingly, they derived an equation for calculating the ordinal comb number, which is expressed as:

$$n = [\pm f_o' - (\pm f_o) + m f_r' \pm f_b' - (\pm f_b)]/(f_r - f_r') \quad (1)$$

wherein m is the ordinal comb number variation when the repetition rate changes from $f_r$ to $f_r'$; $f_b$, $f_b'$ are the beat frequencies for the LUM and the OFC; $f_r$, $f_r'$ and $f_o$, $f_o'$ are the repetition rates and offset frequencies before and after the OFC is adjusted, respectively. At that time, the signs ± could not be determined, and therefore, the correct ordinal comb number could be obtained only after at least two m values were compared. Moreover, in this method, the ordinal comb number variation was recorded as the repetition rate changed. For low repetition rate laser, the number of recorded ordinal comb number is very large. Therefore, this method is not practical.

In the three foregoing methods, sufficient historic data, a high-precision wavemeter and gradually changing repetition rates are required to record all of the ordinal comb number variations so as to obtain the frequency of the LUM. Obviously, these methods are not explicit and not suitable for use in optical frequency measurement for all repetition rates.

Figure 3A:
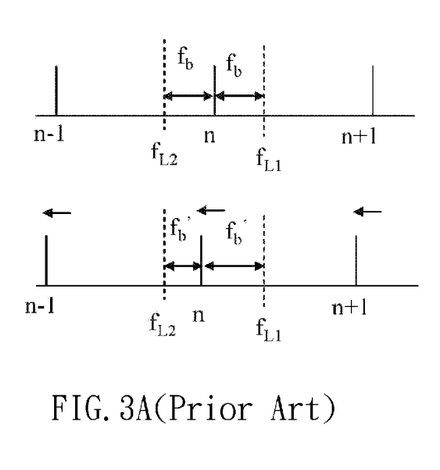
FIG. 3A and FIG. 3B are schematic diagrams showing how the signs of the beat frequencies and the correct offset frequencies are determined by changing the repetition rates or the offset frequencies.
Figure 3B:
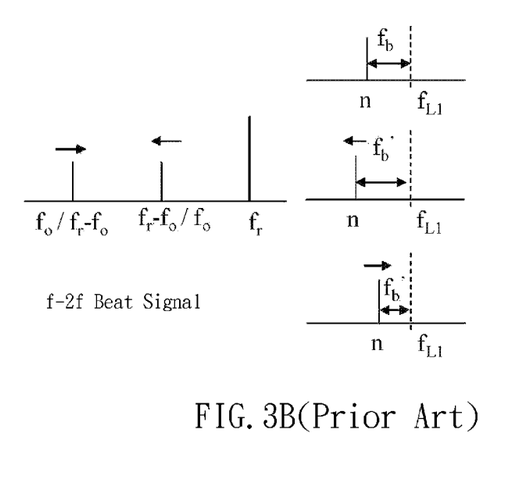
Figure 4A:
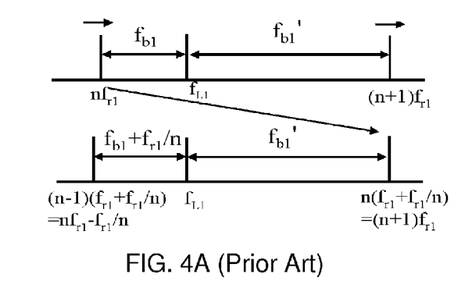
FIG. 4A to FIG. 4D are schematic diagrams showing how the repetition rate variation $f_{r1}/n$ required for changing an ordinal comb number is measured by changing the repetition rates.
Figure 4B:
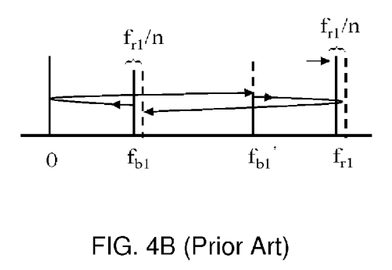
Figure 4C:
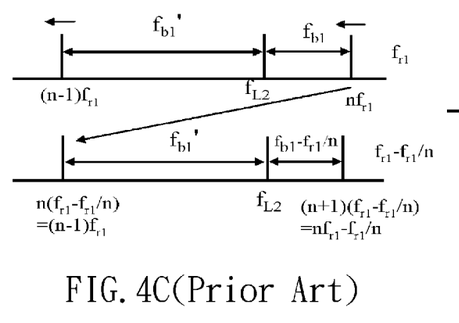
Figure 4D:
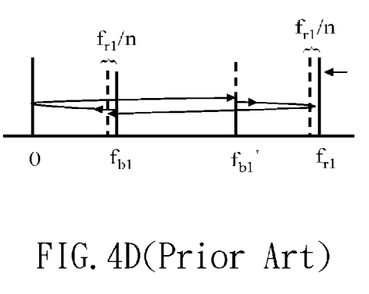

Jin-Long Peng et al. disclosed a method for measuring the ordinal comb number by using mode-locked lasers, which is useful for a wide range of repetition rate. First, the sign of the beat frequency was determined according to the change of the repetition rate and the change of the beat frequency. Then the offset frequency was changed and the correct offset frequency of the mode-locked laser was determined according to the change of the beat frequency, as shown in FIG. 3A and FIG. 3B. The ordinal comb number was determined using two mode-locked laser combs operated at different repetition rates to generate the beat frequencies with the LUM. The frequency of the LUM can be expressed as:

$$f_L = n f_{r1} + f_{o1} \pm f_{b1} \quad (2)$$

$$f_L = (n+m) f_{r2} + f_{o2} \pm f_{b2} \quad (3)$$

From Equations (2) and (3), n can be derived as $$n = [m f_{r2} + f_{o2} - f_{o1} \pm f_{b2} - (\pm f_{b1})]/(f_{r1} - f_{r2}) \quad (4)$$

In Equation (4), $f_{r1}$, $f_{r2}$, $f_{o1}$, $f_{o2}$, $f_{b1}$, $f_{b2}$ can be measured by a microwave frequency counter. The correct offset frequency $f_{o1}$ and $f_{o2}$ and the signs of $f_{b1}$ and $f_{b2}$ can be determined using the foregoing methods. Equation (4) is similar to the Equation (1) derived by Long-Sheng Ma et al. (L.-S. Ma, M. Zucco, S. Picard, L. Robertsson, and R. S. Windeler, IEEE Journal of Selected Topics in Quantum. Electronics. 9, 1066 (2003)) even though the offset frequency is expressed by a different notation. Moreover, Jin-Long Peng et al. disclosed a method for measuring the ordinal comb $$m = \frac{f_{r1} - f_{r2}}{f_{r2}/n} - \frac{f_{o2} - f_{o1} \pm f_{b2}\mu f_{b1}}{f_{r2}} \quad (5)$$

$$= \frac{f_{r1} - f_{r2}}{f_{r1}/n} + \frac{n(f_{r1} - f_{r2})^2}{f_{r1}f_{r2}} - \frac{f_{o2} - f_{o1} \pm f_{b2}\mu f_{b1}}{f_{r2}}$$

$$\approx \frac{f_{r1} - f_{r2}}{f_{r1}/n} - \frac{f_{o2} - f_{o1} \pm f_{b2}\mu f_{b1}}{f_{r2}}$$

if $\frac{n(f_{r1} - f_{r2})^2}{f_{r1}f_{r2}} << 1$ number difference m, which was derived from Equation (4) and expressed as:

The correct offset frequency and the signs of the beat frequencies could be determined using the foregoing method, wherein the repetition rate variation required for changing an ordinal comb number was used to measure $f_{r1}/n$, as shown in FIG. 4A to FIG. 4D, to calculate the m value using Equation (5). Such a method is easier than the method disclosed by Long-Sheng Ma et al. because it is not required to gradually record the change of the ordinal comb number. However, the repetition rate needs to be gradually changed to determine whether the change of the ordinal comb number is completed according to whether the beat frequency returns to its original value twice. This method is time-consuming and an automatized apparatus for optical frequency measurement based on this method is not easy to construct for rapid optical frequency measurement.

Therefore, there is need in providing a method and an apparatus for measuring the ordinal comb number variation without scanning the repetition rate so as to obtain the ordinal comb number and the frequency of an LUM.

SUMMARY OF THE INVENTION

It is an object of the present invention to provide a method and an apparatus for optical frequency measurement, capable of measuring the ordinal comb number difference when frequency-stabilized mode-locked laser combs operating at different repetition rates without scanning the repetition rate so as to measure the ordinal comb number and the frequency of the LUM.

In order to achieve the foregoing object, the present invention provides a method for optical frequency measurement for measuring the frequency of an LUM, comprising steps of:

operating at least a frequency-stabilized mode-locked laser comb(s) at a first repetition rate and a second repetition rate so as to mix with the LUM to generate a first beat frequency and a second beat frequency, respectively; and using a dispersion device to measure an approximate frequency of the LUM and calculating an approximate ordinal comb number according to the approximate frequency, the first repetition rate, the second repetition rate; or operating the frequency-stabilized mode-locked laser combs at a third repetition rate, wherein the third repetition rate is so close to the first repetition rate or the second repetition rate that the ordinal comb numbers of generating the beat frequencies are identical;

calculating the ordinal comb number difference where the first beat frequency and the second beat frequency are generated according to the first repetition rate, the second repetition rate, the third repetition rate, the offset frequencies, the first beat frequency, the second beat frequency and the third beat frequency; and calculating the frequency of the LUM according to the first repetition rate, the second repetition rate, the offset frequencies, the first beat frequency, the second beat frequency and the ordinal comb number.

In order to achieve the foregoing object, the present invention further provides an apparatus for optical frequency measurement for measuring the frequency of a laser under measurement (LUM), comprising:

at least a frequency-stabilized mode-locked laser comb(s) with repetition rates being locked at different reference frequencies and offset frequencies being locked at specific frequencies;

a light coupling device, capable of coupling the frequency-stabilized mode-locked laser combs and the LUM;

a dispersion device, capable of dispersing spectrum of the frequency-stabilized mode-locked laser combs passing through the light coupling device and leading light having the same path as the LUM into a photodetector;

a photodetector, capable of detecting beat frequencies generated by the LUM and the frequency-stabilized mode-locked laser combs;

an RF filter, capable of filtering the beat frequencies detected by the photodetector;

an RF frequency counter, capable of measuring the beat frequencies;

a central control unit, being connected to the RF filter and the RF frequency counter to perform optical frequency measurement and display measured results on a display unit;

a dispersion device scanning controller, being connected to the central control unit and the dispersion device so as to control the position of the dispersion device to detect the position of the LUM or offer an approximate frequency of the LUM; and a mode-locked laser controller, being connected to the central control unit and the frequency-stabilized mode-locked laser combs so as to control the frequencies of the frequency-stabilized mode-locked laser combs.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE PREFERRED EMBODIMENT

The method for optical frequency measurement according to the present invention is different from the aforementioned method using mode-locked lasers in measuring the ordinal comb number difference m. The method of the present invention uses a mode-locked laser comb operating at different repetition rates in turn to measure beat frequencies or two mode-locked laser combs operating at different repetition rates simultaneously to measure beat frequencies. The frequency of the LUM can be expressed as Equations (2) and (3) at different repetition rates and beat frequencies. The ordinal comb number and ordinal comb number difference m are expressed as Equations (4) and (5). The correct offset frequencies and the signs of the beat frequencies can be determined by observing the change of the beat frequencies while changing the repetition rates or the offset frequencies.

In Equation (5), $f_{r1}$, $f_{r2}$, $f_{o1}$, $f_{o2}$, $f_{b1}$, $f_{b2}$ can be precisely measured and m is a positive integer. If n can be approximately known and the relative uncertainty of n is much smaller than 1/m, then, this value of n is sufficient for precisely calculating the m value. Therefore, the wavelength of the LUM can approximately be known as long as a monochromoter or an optical spectrum analyzer is disposed in a two mode-locked laser combs system and the estimated n can be derived from the wavelength of the LUM and the repetition frequency of the laser comb.

In the present invention, the approximate frequency of the LUM can be obtained by dividing the light speed by the wavelength and the refractive index of air, which is 1 with precision within 1/1000. More accurate refractive index of air can be obtained using the Edlén Equation. Therefore, n can be approximately measured according to the approximate frequency and the repetition rates of the optical combs. m can be calculated from Equation (5). A correct m value is an integer closest to the value calculated from Equation (5). n can be obtained by using the correct m value in Equation (4). A correct n value is an integer closest to the value calculated from Equation (4). The frequency of the LUM can be obtained using Equations (2) or (3).

The ordinal comb number difference can also be obtained using the following method. The mode-locked laser combs operate at three different repetition rates. Two of the three repetition rates are almost the same so that the ordinal comb numbers of generating the beat frequencies are identical. For example, let the third repetition rate be $f_{r3}$. If the difference between $f_{r3}$ and $f_{r1}$ is so small that the ordinal comb number where the beat frequency occurs is n. Assuming that the offset frequency is $f_{o1}$, the frequency of the LUM can be expressed as:

$$f_L = n \times f_{r3} + f_{o1} \pm f_{b3} \qquad (6)$$

The ordinal comb number difference can be derived from Equations (2), (3) and (6):

$$m = \frac{(f_{r3} - f_{r2})[f_{o2} - f_{o1} \pm f_{b2} - (\pm f_{b1})] - (f_{r1} - f_{r2})[f_{o2} - f_{o1} \pm f_{b2} - (\pm f_{b3})]}{f_{r2}(f_{r1} - f_{r3})} \qquad (7)$$

The correct m value can be calculated from Equation (7) and the n value can be calculated from Equation (4). The ordinal comb number can also be derived from Equations (4) and (6):

$$n = [\pm f_{b3} - (\pm f_{b1})]/(f_{r1} - f_{r3}) \qquad (8)$$

Since the LUM beats with the same comb line to generate the beat frequency, $f_{r1} - f_{r3}$ is very small. Generally, the uncertainty of $\pm f_{b3} - (\pm f_{b1})$ is much larger than $f_{r1} - f_{r3}$. The uncertainty of the n value obtained from Equation (8) is much larger than 1. Therefore, the n value obtained from Equation (8) is an approximate ordinal comb number, which requires to be used in Equation (5) to calculate a correct m value. The correct m value is then used in Equation (4) so as to calculate a precise n value. Therefore, the present invention is characterized in that the correct ordinal comb number is calculated according to the measured ordinal comb number difference.

In the foregoing method, $f_{r3}$ can also be so close to $f_{r2}$ that the ordinal comb number where the beat frequency is generated is n+m. Assuming that the offset frequency is $f_{o2}$, the frequency of the LUM can be expressed as:

$$f_L = (n+m) \cdot f_{r3} + f_{o2} \pm f_{b3} \qquad (9)$$

The ordinal comb number difference can be obtained from Equations (2), (3) and (9):

$$m = \frac{(f_{o2} - f_{o1} \pm f_{b2} - (\pm f_{b1}))(f_{r1} - f_{r3}) - (f_{o2} - f_{o1} \pm f_{b3} - (\pm f_{b1}))(f_{r1} - f_{r2})}{f_{r1}(f_{r3} - f_{r2})} \qquad (10)$$

Further extending the disclosure of the present invention, if $f_{r3}$ is not so close to $f_{r2}$ that the ordinal comb number where the beat frequency occurs is the same, the minimal ordinal comb number variation can be recorded as the repetition rate changes from $f_{r2}$ to $f_{r3}$. If the ordinal comb number is n+m+k, the frequency of the LUM can be expressed as:

$$f_L = (n+m+k) \cdot f_{r3} + f_{o2} \pm f_{b3} \qquad (11)$$

where the ordinal comb number variation k can be obtained as the repetition rate changes from $f_{r2}$ to $f_{r3}$. Meanwhile, the m value can be expressed as:

$$m = \frac{(f_{r1} - f_{r3})[f_{o2} - f_{o1} \pm f_{b2} - (\pm f_{b1})] - (f_{r1} - f_{r2})[k f_{r3} + f_{o2} - f_{o1} \pm f_{b3} - (\pm f_{b1})]}{f_{r1}(f_{r3} - f_{r2})} \qquad (12)$$

The foregoing method is still within the scope of the present invention. In the method for optical frequency measurement according to the present invention, the offset frequencies can be controlled to be identical, which leads to simplified calculation by eliminating the offset frequencies when the ordinal comb number or the ordinal comb number difference is being calculated.

The advantage in using two mode-locked laser combs for optical frequency measurement is that the beat frequencies at different repetition rates can be measured at the same time. For example, in the case of $f_{r1}$ and $f_{r3}$ are close to each other, $f_{b1}$ and $f_{b2}$ in Equation (7) are measured simultaneously by operating the repetition rates of the two laser combs at $f_{r1}$ and $f_{r2}$, then, $f_{r1}$ is changed to $f_{r3}$ and $f_{r2}$ is keeping unchanged and another set of $f_{b2}$ and $f_{b3}$ are measured simultaneously. By selecting the proper beat frequencies and simultaneously measuring the beat frequencies at different repetition rates, the frequency perturbation of the LUM can be eliminated in the calculation of the ordinal comb number or the ordinal comb number difference. Therefore, the measurement of the ordinal comb number or the ordinal comb number difference is independent from the frequency perturbation of the LUM so as to achieve rapid measurement of optical frequency measurement. Even though the foregoing advantage does not exist when only one mode-locked laser comb is used, the measurement the frequency of the LUM can be performed when the integrating time is longer or the repetition rate variation is larger.

Figure 5:
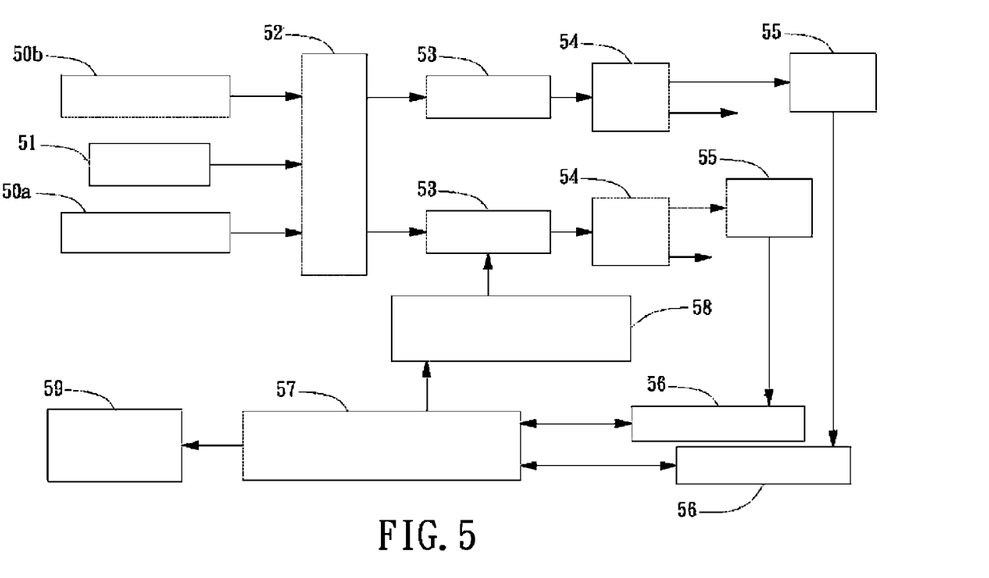
FIG. 5 is a schematic diagram showing an apparatus for optical frequency measurement according to the present invention.

The apparatus for optical frequency measurement of the present invention comprises two mode-locked laser combs, as shown in FIG. 5. The apparatus comprises:

a first frequency-stabilized mode-locked laser comb 50a and a second frequency-stabilized mode-locked laser comb 50b with repetition rates being locked at different reference frequencies and offset frequencies being locked at specific frequencies;

a light coupling device 52, capable of coupling the frequency-stabilized mode-locked laser combs 50a, 50b and the LUM 51;

a dispersion device 53, capable of dispersing the spectrum of the frequency-stabilized mode-locked laser combs 50a, 50b after passing through the light coupling device 52 and introducing light having the same path as the LUM 51 into a photodetector 54;

a photodetector 54, capable of detecting beat frequencies generated by the LUM 51 and the frequency-stabilized mode-locked laser combs;

an RF filter 55, capable of filtering the beat frequencies detected by the photodetector 54;

an RF frequency counter 56, being connected to the RF filter 55 so as to measure the beat frequencies;

a central control unit 57, being connected to the RF filter 55 and the RF frequency counter 56 to perform optical frequency measurement and display measured results on a display unit (not shown);

a dispersion device scanning controller 58 (or a photodetector positioning controller), being connected to the central control unit 57 and the dispersion device 53 (or the photodetector 54) so as to control the position of the dispersion device 53 (or the photodetector 54) to detect the position of the LUM 51 or offer an approximate frequency of the LUM 51; and a mode-locked laser controller 59, being connected to the central control unit 57 and the frequency-stabilized mode-locked laser combs 50a and 50b so as to control the frequencies of the frequency-stabilized mode-locked laser combs 50a and 50b.

Figure 6:
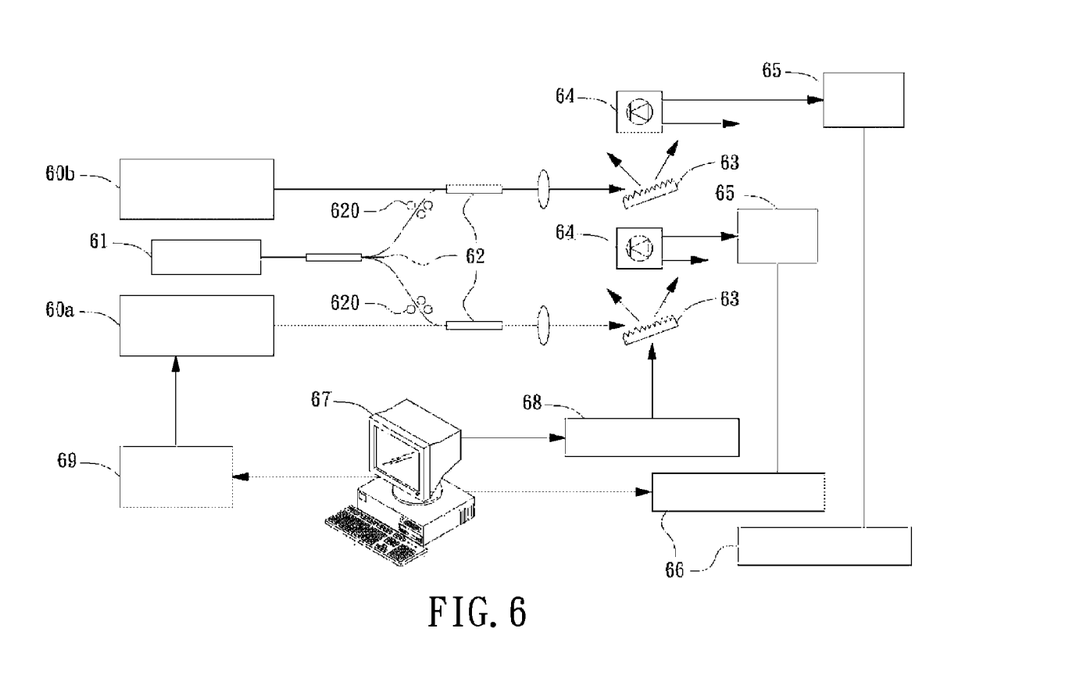
FIG. 6 is an example of an apparatus for optical frequency measurement according to the present invention.

Please refer to FIG. 6, which is an example of an apparatus for optical frequency measurement according to the present invention. In FIG. 6, the connection between related devices is similar to that in FIG. 5, and thus description thereof is not repeated.

In FIG. 6, two frequency-stabilized mode-locked laser combs 60a, 60b operate at different repetition rates. Please refer to J.-L. Peng, H. Ahn, R.-H. Shu, H.-C. Chui and J. W. Nicholson, Applied Physics B 86, 49 (2007) for frequency-stabilized mode-locked laser combs. The LUM 61 is coupled to the fiber laser combs 60a, 60b through a fiber coupler 62. A polarization controller 620 is adjusted so that the LUM 61 and comb polarization are oriented to the same direction. After dispersed by the grating 63, the coupled light having the same dispersion path as the LUM is incident on the photodetector 64. The detected beat frequencies are filtered by the RF filter 65 and are measured by two frequency counters 66. A computer 67 controls the measurement and displays the measured results.

Figure 7:
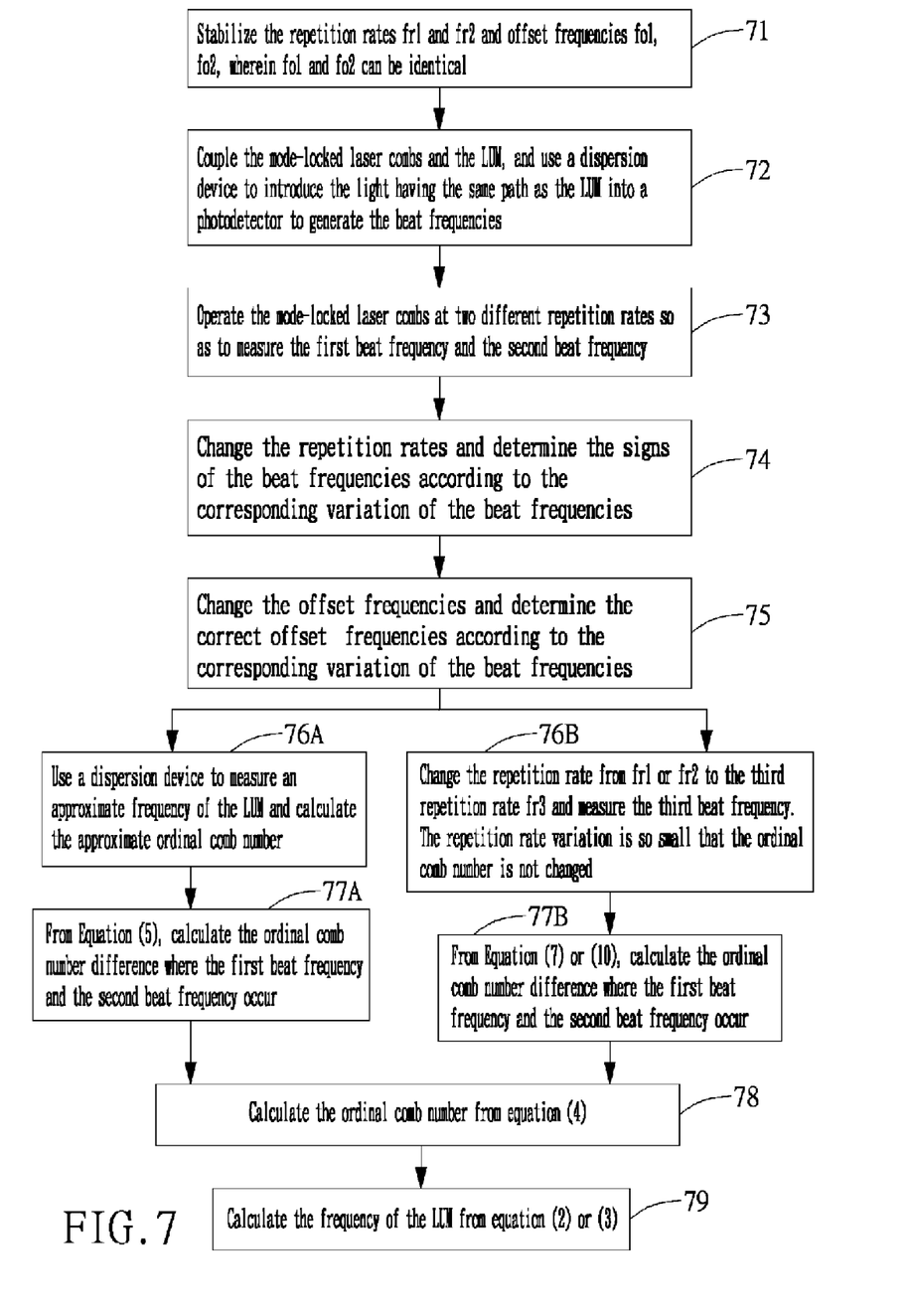
FIG. 7 is a flow-chart showing a method for optical frequency measurement according to the present invention.

FIG. 7 is a flow-chart showing a method for optical frequency measurement using two mode-locked laser combs according to the present invention.

In Step 71, the computer controls the mode-locked laser controller to lock the repetition rate of the mode-locked laser comb 60a at $f_{r1}$ and to lock the offset frequency at $f_{o1}$, and to lock the repetition rate of the mode-locked laser comb 60b at $f_{r2}$ and to lock the offset frequency at $f_{o2}$. The measurement can be simplified when the correct offset frequency $f_{o1}$ and $f_{o2}$ are locked at the same frequency.

In Step 72, the mode-locked laser combs and the LUM are coupled. A dispersion device is used to introduce the light having the same path as the LUM into a photodetector to generate the beat frequencies. As shown in FIG. 6, the light of the laser comb for frequency measurement is blocked, which can be implemented by turning off a light amplifier for this light beam. Then, a scanning grating 63 enables the LUM 61 to be incident on the photodetector 64, which is determined according to the DC voltage on the photodetector 64. Then, the laser comb is incident on the photodetector 64.

In Step 73, the mode-locked laser combs operates at two different repetition rates so as to measure the first beat frequency and the second beat frequency. As shown in FIG. 6, the AC output from the photodetector 64 comprises the beat signal of the LUM 61. The beat frequency is filtered by an RF filter 65. Then, beat signals $f_{b1}$ and $f_{b2}$ are simultaneously measured by two microwave frequency counters 66.

In Step 74, the signs of the beat frequencies are determined. The repetition rates $f_{r1}$ and $f_{r2}$ are slightly changed so as to determine the signs of the beat frequencies $f_{r1}$ and $f_{r2}$ according to the change of the repetition rates $f_{r1}$ and $f_{r2}$.

In Step 75, the correct offset frequencies of the mode-locked laser combs are determined. The offset frequency $f_{o1}$ is changed so as to determine the correct offset frequency $f_{o1}$ according to the change of the beat frequency $f_{b1}$. The offset frequency $f_{o2}$ is changed so as to determine the correct offset frequency $f_{o2}$ according to the change of the beat frequency $f_{b2}$.

In Step 76A, the ordinal comb number difference is determined. The calibrated grating 63 determines an approximate frequency of the LUM 61. An approximate ordinal comb number can be calculated according to the approximate frequency and the repetition rate. The m value is calculated from Equation (5) in Step 77A. The signs of the beat frequencies need to be adjusted according to practical measurement. The correct m value is an integer closest to the calculated value from Equation (5).

The determination of the ordinal comb number difference is also performed in Step 76B by changing the repetition rate from $f_{r1}$ or $f_{r2}$ to the third repetition rate $f_{r3}$ and measuring the third beat frequency. The repetition rate variation is so small that the ordinal comb number is not changed. The ordinal comb number difference can be calculated from Equation (7) or (10) in Step 77B.

In Step 78, the ordinal comb number is calculated from Equation (4). The signs of the beat frequencies are adjusted according to practical measurement. The correct n value is an integer closest to the calculated value from Equation (4).

In Step 79, the frequency of the LUM is calculated from Equation (2) or (3). The signs of the beat frequencies are adjusted according to practical measurement.

The method for optical frequency measurement using one mode-locked laser comb comprises similar steps. However, the beat frequencies at different repetition rates cannot be measured simultaneously. In this case, the beat frequencies are measured successively by a frequency counter.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A method for optical frequency measurement for measuring the frequency of a laser under measurement (LUM), comprising steps of:
    operating two frequency-stabilized mode-locked laser combs at a first repetition rate and a second repetition rate, and mixing said frequency-stabilized mode-locked laser combs with the LUM to generate a first beat frequency and a second beat frequency, respectively;
    using a dispersion device to measure an approximate frequency of the LUM and calculating an approximate ordinal comb number according to the approximate frequency, the first repetition rate, and the second repetition rate;
    calculating the ordinal comb number difference where the first beat frequency and the second beat frequency are generated according to the first repetition rate, the second repetition rate, the offset frequencies, the first beat frequency, the second beat frequency and the approximate ordinal comb number;
    calculating an ordinal comb number of the comb lines, which generates said first beat frequency or said second beat frequency, from said ordinal comb number difference; and
    calculating the frequency of the LUM according to the repetition rate, the offset frequency, the beat frequency, and the ordinal comb number.

2. The method for optical frequency measurement as recited in claim 1, further comprising steps of:
    operating the frequency-stabilized mode-locked laser combs at a third repetition rate so as to mix with the LUM to generate a third beat frequency, wherein the third repetition rate is so close to the first repetition rate or the second repetition rate that the ordinal comb numbers of generating the beat frequencies are identical; and
    calculating the ordinal comb number difference where the first beat frequency and the second beat frequency are generated according to the first repetition rate, the second repetition rate, the third repetition rate, the offset frequencies, the first beat frequency, the second beat frequency and the third beat frequency.

3. The method for optical frequency measurement as recited in claim 1, further comprising a step of:
    changing the repetition rates of the frequency-stabilized mode-locked laser combs and determining the signs of the beat frequencies where the frequency of the LUM is calculated according to the change of the beat frequencies.

4. The method for optical frequency measurement as recited in claim 1, further comprising a step of:
    changing the offset frequencies of the frequency-stabilized mode-locked laser combs and determining correct offset frequencies according to the change of the beat frequencies.

5. The method for optical frequency measurement as recited in claim 1, wherein the dispersion device is a grating.

6. The method for optical frequency measurement as recited in claim 1, wherein the dispersion device is a prism.

7. A method for optical frequency measurement for measuring the frequency of a laser under measurement (LUM), comprising steps of:
    operating two frequency-stabilized mode-locked laser combs at a first repetition rate and a second repetition rate, and mixing said frequency-stabilized mode-locked laser combs with the LUM to generate a first beat frequency and a second beat frequency, respectively;
    operating said frequency-stabilized mode-locked laser combs at a third repetition rate and mixing with the LUM to generate a third beat frequency, wherein said third repetition rate is so close to said first repetition rate or said second repetition rate that the ordinal comb numbers of generating the beat frequencies are identical; and
    calculating the ordinal comb number difference between the comb lines, which generate said first beat frequency and said second beat frequency, from the measured beat frequencies and the repetition rates,
    calculating the ordinal comb number of the comb line, which generates said first beat frequency or said second beat frequency, using said ordinal comb number difference; and
    calculating the frequency of the LUM using said ordinal comb number.

8. The method for optical frequency measurement as recited in claim 7, further comprising a step of:
    changing the repetition rates of the frequency-stabilized mode-locked laser combs and determining the signs of the beat frequencies where the frequency of the LUM is calculated according to the change of the beat frequencies.

9. The method for optical frequency measurement as recited in claim 7, further comprising a step of:
    changing the offset frequencies of the frequency-stabilized mode-locked laser combs and determining correct offset frequencies according to the change of the beat frequencies.

* * * * *